April 28, 1964 P. J. ALDRIDGE 3,130,889

SOUND RECORDING AND REPRODUCING APPARATUS

Filed Dec. 3, 1962 2 Sheets-Sheet 1

Inventor
P. J. Aldridge
By Holcombe, Wetherill & Brisebois
Attorneys

April 28, 1964 P. J. ALDRIDGE 3,130,889

SOUND RECORDING AND REPRODUCING APPARATUS

Filed Dec. 3, 1962

2 Sheets-Sheet 2

Inventor
P. J. Aldridge
By
Holcombe, Wetherill & Brisebois
Attorneys

United States Patent Office 3,130,889

Patented Apr. 28, 1964

3,130,889

SOUND RECORDING AND REPRODUCING APPARATUS

Peter John Aldridge, Upminster, Essex, England, assignor to The Magnavox Electronics Company Limited, Barking, England, a British company Filed Dec. 3, 1962, Ser. No. 241,873
Claims priority, application Great Britain Dec. 5, 1961
2 Claims. (Cl. 226—178)

In most tape recorders, tape decks and other recording and sound reproducing apparatus in which magnetic tape is employed, it is usual to make provision for driving the tape through the apparatus at two or more speeds. The greater the sensitivity required the greater the speed at which the tape is moved. The usual way of moving the tape through the apparatus is by means of a roller which engages the surface of the tape frictionally. This driving roller is commonly known as the capstan.

The usual way of adjusting the speed at which the tape is fed through the apparatus is by adjusting the speed of rotation of the capstan and for this purpose some form of change speed gear has usually been necessary. This form of driving mechanism is, however, complicated and therefore costly.

According to the present invention, the capstan in sound reproducing or recording apparatus has a driving mechanism by which it is rotated at a constant speed and it has two coaxial tape driving portions of different diameters, and a mechanism is provided by which the capstan can be moved axially to bring either one portion or the other into a driving position in contact with the tape.

This arrangement can be constructed extremely simply and the capstan can be directly connected to the driving motor by which it is driven constantly.

Preferably, the capstan comprises a fly wheel with a spindle projecting upwards from it. The two co-axial portions of different diameters, either one of which can drive the tape, are then provided on the spindle. The spindle may pass right through the fly wheel and the lower end of the spindle, that is the one which does not have the two portions of different diameters on it, is then supported in a combined journal and thrust bearing. The thrust is taken by a ball on which the end surface of the spindle rests and the ball is acted upon by one arm of a two armed lever. This lever is provided with a manual control by which it can be rocked and which, on rocking, moves the ball and with it the spindle upwards and downwards to bring either the one portion or the other of the spindle into the driving position in contact with the tape.

An example of a tape recording apparatus constructed in accordance with the invention is illustrated in the accompanying drawings, in which.

Figure 1:
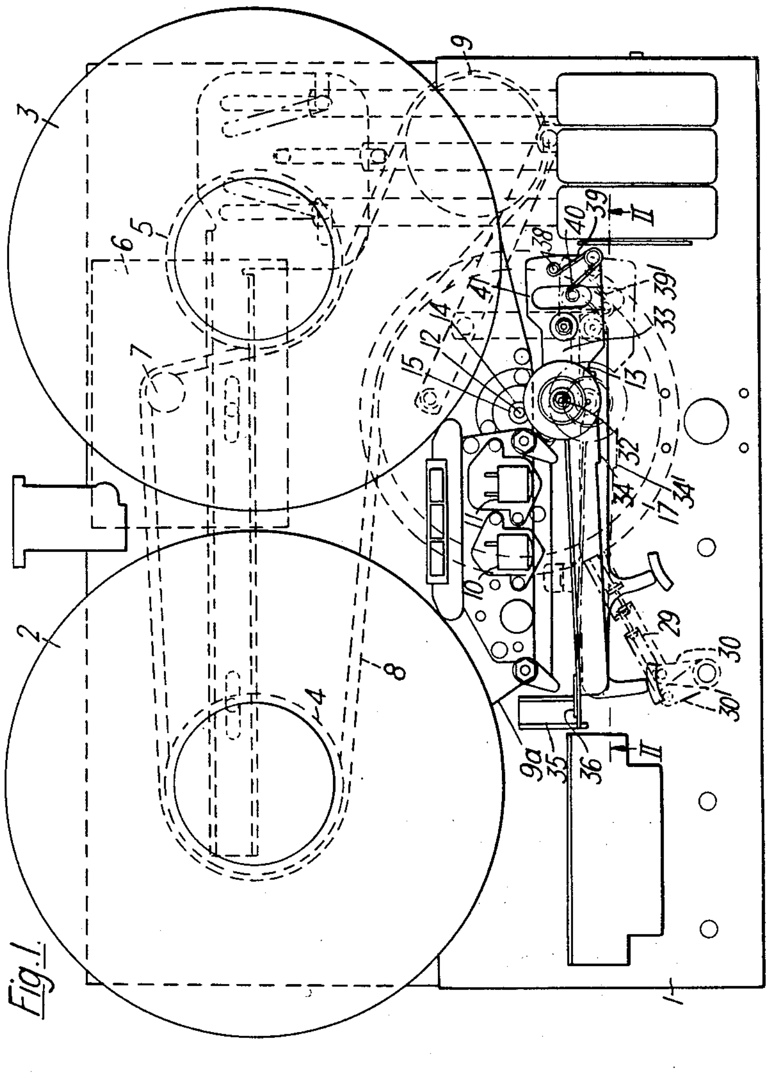
FIGURE 1 is a plan view of the tape recorder showing the relevant parts.

The tape recorder has a base plate 1 on which tape reels 2 and 3 are rotatably mounted. The tape reels 2 and 3 have pulleys 4 and 5 respectively attached to them and lying under the base plate. The reels 2 and 3 and various other rotatable parts of the tape recorder are driven by a constant speed electric motor 6 which has an output pulley 7. A belt 8 passes around the pulley 7 and also over a part of the periphery of the pulleys 4 and 5. The belt 8 also passes round a guide wheel 9.

The magnetic tape itself *9a* is moved past recording and reproducing heads 10 and 11 by means of a capstan 12 against which the tape is pressed by a pressure roller 13. The capstan 12 has two driving portions 14 and 15 which are co-axial with each other but are of different diameters. These two portions are on the upper end of a spindle 16, which passes through and is fixed to a flywheel 17 which is also driven by the contact with it of the belt 8.

Figure 2:
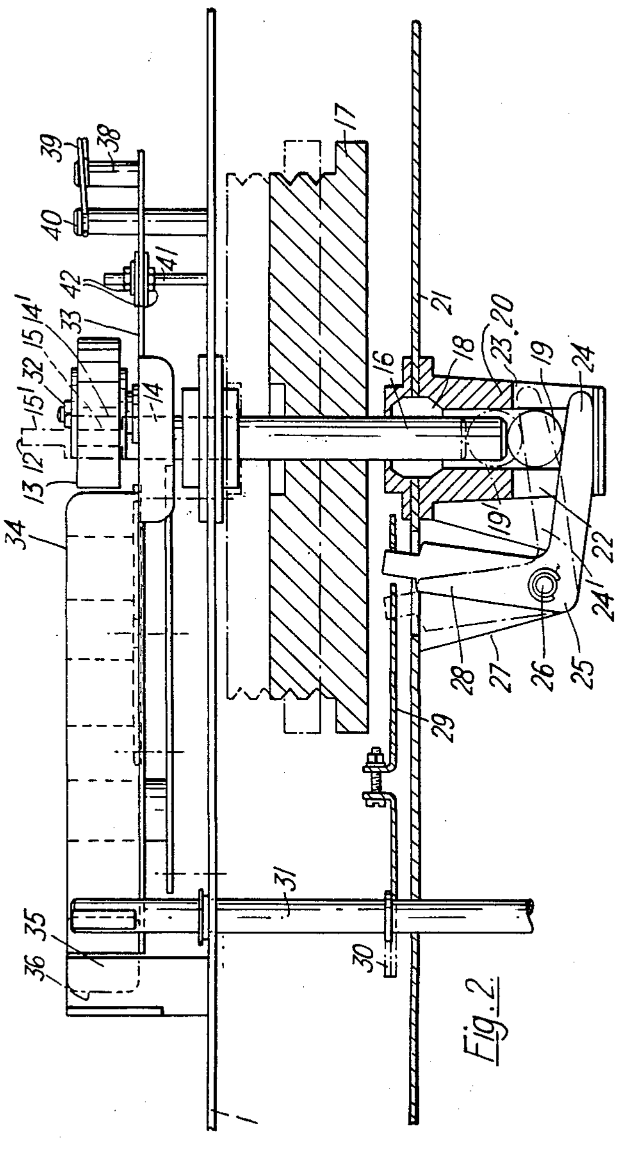
FIGURE 2 is a view of part of the tape recorder as seen in the direction of the arrows on the line 2—2 in FIGURE 1 with some parts shown in section.

The lower end of the spindle 16 is mounted in a journal bearing 18 and its lower end rests on a ball 19 which forms a thrust bearing. Both the journal bearing 18 and the ball 19 are contained within a housing 20 mounted on a plate 21. The plate 21 is fixed to the base plate 1 by brackets which are not shown in the drawings. The housing 20 has two longitudinal slots 22 and 23 through which one arm 24 of a bell crank lever 25 projects. The bell crank lever 25 is pivoted on a pin 26, which is fixed to a bracket 27 projecting downwards from the plate 21. The second arm 28 of the bell crank lever 25 has an operating rod 29 loosely attached to it. The operating rod 29 connects the bell crank lever 25 to a control lever 30, which is fixed to a control shaft 31. When the shaft 31 is rotated counter-clockwise manually as shown in FIGURE 2 of the drawings, the lever 30 pulls the rod 29 and thus rocks the bell crank lever 25 in a counter-clockwise direction as seen in FIGURE 2 of the drawings. This moves the bell crank lever so that the arm 24 takes up the position shown in broken lines at 24′. This in turn moves the ball 19 into the position 19′ and lifts the spindle 16 so that its portion of smaller diameter 15 is raised to the position 15′ and its portion of larger diameter 14 is raised to the position 14′ formally occupied by the portion 15.

When the bell crank lever 25 is in the position shown in full lines in FIGURE 2 of the drawings, the portion 15 of the capstan spindle 16 is in alignment with the pressure roller 13 and has the magnetic tape pressed against its periphery. This causes the tape to be moved past the recording head 10 and the reproducing head 11 at a certain speed which is dependent upon the speed of rotation of the pulley 7. When the knob 30 is rocked into its second position shown in dotted lines at 30′, and in consequence the spindle 16 is raised the portion 14 of the spindle 16 is aligned with the pressure roller 13 and the tape is pressed against its periphery, so that the tape is moved at a greater speed.

The mounting of the pressure roller 13 is described and claimed in my co-pending application No. 241,874, filed December 3, 1962 and briefly this is as follows: The roller 13 is rotatably mounted on a pin 32 which is fixed to and projects upwardly from the bottom flange 33 of an arm 34 of L-shaped section. The left hand end of the arm 34 is attached to a bracket 35 which projects upwards from the base plate 1 by a hinge consisting of a strip 36 made of flexible nylon attached to the bracket 35 and the arm 34 by rivets. The right hand end of the arm 34 has a pin 38 projecting upwards from it and attached to the upper end of this pin is a U-shaped spring 39. One arm of the U-shaped spring 39 is attached to the pin 38 and the other arm is attached to a second pin 40 which projects upwards from the base plate 1 through a slot 41 in the arm 34. When the U-shaped spring 39 is in the position shown in full lines in FIGURE 1 of the drawings it urges the arm 34 upwards, that is in a counter-clockwise direction about its hinge 36 and so presses the pressure roller 13 against the capstan 12. If the arm 34 is pulled manually downwards, the spring 39 passes through a bottom dead centre position into a position shown in chain dotted lines at 39′ in FIGURE 1. In this position, the arm 34 is in stable equilibrium and is held in its downwardly pulled position by the spring 39. This arrangement is made to enable the tape to be threaded up in its path from the reel 2 to the reel 3 in which it passes between the pressure roller 13 and the capstan 12. Slight adjustments in the height of the pressure roller 13 can be made to enable it to be accurately aligned with the portion 14 or the portion 15 of the spindle 16 by means of a screw threaded pin 41 which passes through a hole in the bottom part 33 of the arm 34 and is fixed to the bottom part 33 by lock nuts 42. The bottom of the pin 41 rests on, and slides along, the plate 1 and the amount of the screw threaded pin 41 which projects below the arm 34, and hence the height of the arm 34 above the base plate 1, can be adjusted by screwing up or unscrewing the lock nuts 42. The slight alteration in the height of the roller 13 is allowed to take place by a very slight buckling of the nylon hinge 36.

To alter the speed at which the tape is driven by the capstan through the tape recorder, the arm 34 is first moved downwards into the position shown at 34' in FIGURE 1 of the drawings and then the spindle 16 is moved upwards or downwards by moving the control lever 30 as already described, after which the arm 34 is moved upwards again so that the pressure roller 13 again presses the tape against the capstan 12 under the action of the spring 39. In this example, the portion 14 of the capstan moves the tape through the tape recorder at a speed of 3¾ inches per second and the portion 15 moves the tape at twice this speed, that is at 7½ inches per second, although the speeds may of course be altered and will depend upon the quality and sensitivity of the recording required.

I claim:

1. Magnetic tape sound reproducing and recording apparatus comprising a rotary capstan for moving the tape through the apparatus, a driving mechanism, transmission means operatively connecting said driving mechanism to said capstan to rotate said capstan at constant speed, said capstan comprising a flywheel and a spindle extending axially through and fixed to said flywheel, a combined journal and thrust bearing supporting one end of said spindle and two co-axial driving portions of different diameters at the other end of said spindle, said bearing including a ball on which a surface at said one end of said spindle rests and a two armed lever one arm of which acts on said ball and manually operated means acting on the other arm of said lever to rock said lever and move said ball and with it said spindle upwards and downwards to bring either the one or the other of said two co-axial driving portions into said driving position in contact with said tape.

2. Apparatus as claimed in claim 1 wherein said bearing includes a housing mounting said ball and wherein said ball is slidable upwards and downwards, vertical wall portions of said housing defining a vertical slot through which said lever projects.

References Cited in the file of this patent

UNITED STATES PATENTS

| | | |
|---|---|---|
| 2,681,224 | Bessire | June 15, 1954 |
| 3,050,225 | Ulman | Aug. 21, 1962 |
| 3,079,056 | Groenewegen | Feb. 26, 1963 |
| 3,085,758 | Hermann et al. | Apr. 16, 1963 |